US011552510B2

(12) United States Patent
Van Der Wal (10) Patent No.: US 11,552,510 B2
(45) Date of Patent: Jan. 10, 2023

(54) IN-WHEEL MOTOR PROVIDED WITH COOLING CHANNELS, AND A COOLING JACKET

(71) Applicant: E-TRACTION EUROPE B.V., Apeldoorn (NL)

(72) Inventor: Reinhard Peter Van Der Wal, Apeldoorn (NL)

(73) Assignee: E-TRACTION EUROPE B.V., Apeldoorn (NL)

(*) Notice: Subject to any disclaimer, the term of this patent is extended or adjusted under 35 U.S.C. 154(b) by 232 days.

(21) Appl. No.: 16/632,028

(22) PCT Filed: Jul. 20, 2018

(86) PCT No.: PCT/NL2018/050502
§ 371 (c)(1),
(2) Date: Jan. 17, 2020

(87) PCT Pub. No.: WO2019/017786
PCT Pub. Date: Jan. 24, 2019

(65) Prior Publication Data
US 2020/0153291 A1 May 14, 2020

(30) Foreign Application Priority Data

Jul. 20, 2017 (NL) .................................. 2019306

(51) Int. Cl.
*H02K 1/20* (2006.01)
*B60K 7/00* (2006.01)
(Continued)

(52) U.S. Cl.
CPC ............. *H02K 1/20* (2013.01); *B60K 7/0007* (2013.01); *H02K 5/203* (2021.01); *H02K 7/006* (2013.01); *H02K 9/193* (2013.01); *H02K 21/22* (2013.01)

(58) Field of Classification Search
CPC .......... H02K 1/20; H02K 7/006; H02K 9/193; H02K 21/22; H02K 5/203; H02K 9/19;
(Continued)

(56) References Cited

U.S. PATENT DOCUMENTS

| 7,059,437 B2 | 6/2006 | Heinen |
| 7,347,427 B2 | 3/2008 | Heinen |

(Continued)

FOREIGN PATENT DOCUMENTS

| EP | 1252034 B1 | 11/2004 |
| EP | 2940835 A1 | 11/2015 |

(Continued)

OTHER PUBLICATIONS

International Search Report and Written Opinion, dated Nov. 22, 2018, from corresponding PCT application No. PCT/NL2018/050502.

*Primary Examiner* — Tulsidas C Patel
*Assistant Examiner* — Viswanathan Subramanian
(74) *Attorney, Agent, or Firm* — Nixon & Vanderhye (57) ABSTRACT

An in-wheel motor for a vehicle includes: a stator with a connector attaching the stator to the vehicle, the connector including a shaft, an end plate of a larger diameter than the shaft, and a coolant passage through the end plate, the stator further including a hollow stator body with cylindrical outer surface and mounted to the connector. Cooling channels for circulating liquid coolant extend along the hollow stator body and are in fluid connection with the coolant supply duct, the cooling channels having an inlet for supply of liquid coolant to the plurality of channels and an outlet for discharging liquid coolant from the plurality of channels; wherein, at a side opposite from the connector member, the hollow stator body has an open end with a diameter larger (Continued)

than the diameter of the shaft. Also disclosed is a cooling jacket for such an in-wheel motor.

18 Claims, 4 Drawing Sheets

(51) Int. Cl.
*H02K 7/00* (2006.01)
*H02K 9/193* (2006.01)
*H02K 21/22* (2006.01)
*H02K 5/20* (2006.01)

(58) Field of Classification Search
CPC ............ B60K 7/0007; B60K 2001/006; B60K 11/02; Y02T 10/64
See application file for complete search history.

(56) References Cited

U.S. PATENT DOCUMENTS

| | | | |
|---|---|---|---|
| 9,387,758 | B2 | 7/2016 | Heinen et al. |
| 9,653,961 | B2 * | 5/2017 | Silva ...................... H02K 15/14 |
| 2013/0126143 | A1 | 5/2013 | Sheu et al. |
| 2014/0159468 | A1 * | 6/2014 | Heinen ................. B60L 3/0061 |
| | | | 301/6.3 |
| 2015/0308456 | A1 | 10/2015 | Thompson et al. |
| 2017/0110933 | A1 | 4/2017 | Michel |
| 2017/0111003 | A1 * | 4/2017 | Kikuchi ................... H02K 3/28 |
| 2017/0152809 | A1 * | 6/2017 | Wicks ....................... F02F 1/18 |

FOREIGN PATENT DOCUMENTS

| | | |
|---|---|---|
| JP | 2012244810 A * 12/2012 | |
| WO | 2013/025096 A1 2/2013 | |
| WO | WO-2016062438 A1 * 4/2016 | ............... H02K 9/19 |

* cited by examiner

IN-WHEEL MOTOR PROVIDED WITH COOLING CHANNELS, AND A COOLING JACKET

FIELD OF THE INVENTION

The present invention relates to an in-wheel motor comprising a stator provided with electromagnets and a plurality of cooling channels which extend along the stator body and through which coolant can flow for cooling the electromagnets. The invention further relates to a cooling jacket for use in an in-wheel motor.

BACKGROUND ART

US 201 3/01 261 43 A1 describes a cooling jacket for cooling an electric motor, wherein the cooling jacket has one or more continuous S-shaped pipes, covering the electric motor, for conducting working fluid, wherein each continuous S-shaped pipe at least has: a forwarding portion and a reversed portion, respectively extending along two circumferential directions which are parallel but opposite to each other; and a turning portion connected between the forwarding portion and the reversed portion. When the cooling jacket is used to cool the electric motor, the temperature of working fluid within the S-shaped pipes typically increases from one end of the motor to another end of the motor.

From WO 2013/025096 an electric vehicle with an in-wheel electric motor is known, in which the rotor of the electric motor is coupled to a rim of the wheel carrying one or more tyres. The stator is mounted on the frame of the vehicle via a wheel suspension system. The known in-wheel motor is part of a direct drive wheel in which the electromagnets of the motor directly drive the rim and the tyre without any intermediate gears. In this manner, weight and space are saved and the number of components in the vehicle's drive assembly is minimized.

The torque that is generated by the in-wheel motor depends on the flux-carrying surface between the rotor and the stator and is a quadratic function of the rotor radius. The rotor magnets are placed as far outwardly as possible around the stator, to obtain a largest possible rotor radius and the motor design is optimised to minimize the gap between the rotor and the stator for delivering a maximum power and torque to the tyre. The gap width between rotor and stator is on the other hand designed to be large enough to absorb mechanical impacts on the wheel during driving conditions.

The windings of the stator are powered by control electronics that are situated within the stator, which control electronics convert electrical energy from a power supply system of the vehicle, e.g. a battery pack and/or an electric generator, to an AC current that is suitable for use by the electric motor. Such control electronics typically comprise power control electronics, e.g. IGBT current modules and a current regulator, such as described in EP 1 252 034. By using the control electronics to control the current and/or voltage supplied to the windings of the stator, the magnetic field vector of the flux generated by the stator is controlled and the electric motor is operated at the desired torque and/or speed of rotation. By integrating the control electronics within the stator, the length of bus bars which run from the control electronics to the electromagnets can remain short, which is highly desirable in view of minimizing losses of the high electrical currents and voltages generally required for operating such an electric motor, which may for instance amount to 300 A at 700V or more.

In order to cool the electric motor and/or the control electronics, the known in-wheel motor is provided with a cooling system having a meandering cooling channel that is situated close to an outer surface of the stator and the control electronics, through which liquid coolant can flow into and out of the stator. The cooling duct is arranged such that, after the cooling fluid has passed along the control electronics for cooling these, the cooling fluid meanders back to an end point of the cooling duct at a vehicle side of the cooling system during which the fluid can absorb heat energy from the electromagnets.

The in-wheel motor can be embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The in-wheel motor may be mounted on the vehicle in a variety of positions by connecting the vehicle side of the in-wheel motor to the vehicle frame.

It is often desirable to have direct access to the control electronics, for instance for inspection or repair of the control electronics. For the known in-wheel motor, when it is connected to a vehicle frame, this requires at least partial disassembly of the motor during which a connection for supplying coolant to the cooling channels of the cooling system has to be temporarily disconnected. This typically includes removing coolant from the channels before disassembly and refilling the channels with coolant upon reassembly, bringing with it the risk of coolant spilling, e.g. on the control electronics.

The present invention aims to provide an in-wheel motor which can be more easily maintained and/or inspected.

It is a further object of the present invention to provide an in-wheel motor in which cooling of the electromagnets of the stator is improved..

SUMMARY OF THE INVENTION

To this end, according to a first aspect the present invention provides an in-wheel motor for a vehicle, the in-wheel motor comprising: a stator with a connector member for attaching the stator to the vehicle, the connector member comprising a shaft, an end plate of a larger diameter than the shaft, and a coolant supply duct extending through said shaft and in fluid connection with a passage for coolant in the end plate, the stator further comprising a hollow stator body having a cylindrical outer surface and connected to the connector member, wherein a plurality of cooling channels adapted for circulation of a liquid coolant extends along the hollow stator body and are in fluid connection with said coolant supply duct, said plurality of cooling channels having an inlet for supply of liquid coolant to the plurality of channels and an outlet for discharging liquid coolant from the plurality of channels; the in-wheel motor further comprising electromagnets arranged around the hollow stator body and fixed with respect thereto, wherein the cooling channels are arranged for cooling the electromagnets; wherein, at a side opposite from the connector member, the hollow stator body has an open end with a diameter larger than the diameter of the shaft, wherein the plurality of channels is partitioned into at least three groups of channels, wherein the channels within each group are connected in parallel and define a direction of flow for said coolant such that for each channel within a group the coolant flows substantially in a same direction along the circumference of the hollow stator body from a first end of the channel to a second end of the channel, wherein at least one of said groups comprises two or more channels, and wherein the groups are connected in series, wherein each of the circumferential cooling channels is formed as an annular sector extending 180 degrees or more and less than 360 degrees around the longitudinal axis of said hollow stator body.

By providing two or more parallel channels in at least one of the groups, a drop in pressure of the cooling fluid along the direction of flow is reduced and consequently the cooling efficiency is improved. Moreover, control electronics for the in-wheel motor can thus easily be placed into the hollow stator body, inspected and/or taken out again, through the open end of the hollow stator body. The open end is arranged at a road side of the hollow stator body, so that the control electronics may be accessed from the road side rather than from a vehicle side of the stator body. The connector member and stator can in this way remain attached to a vehicle during maintenance, repair or inspection of the components, such as control electronics, within the hollow stator body. To gain access to the interior of the hollow stator body, a rotating cover plate at a road side of the rotor can be removed, which rotating cover plate closes off the open end of the hollow stator body and is rotatably connected to the hollow stator body via bearings at a road side of the rotor. The cover plate and the bearings can be attached to the stator and/or detached therefrom from the road side.

Access to the interior of the hollow stator body can thus be obtained without disassembling the stator itself, in particular without disconnecting a fluid connection between the inlet of the cooling channels and the fluid supply duct and/or the passage in the end plate. In this manner the risk of leakage of liquid coolant is substantially reduced. In case the control electronics are to be removed from the hollow stator body, liquid coolant is preferably drained from the fluid supply duct and/or the passage prior to removing the control electronics from the stator body.

Preferably, the diameter of the open end is large enough to allow the control electronics for the wheel to be placed into the hollow stator body or taken out of the hollow stator body from said road side, while the position of the plurality of cooling channels remains fixed with respect to the end plate, in particular without disconnecting the fluid connection between the inlet and the passage for coolant in the end plate.

In an embodiment the open end extends from the side opposite from the connector member, substantially up to the end plate. In this manner a relatively large amount of space along the axial direction of remains available within the hollow stator body, e.g. for accommodating control electronics of the in-wheel motor. The diameter of the open end is preferably at least 90% of the outer diameter of the end plate.

In an embodiment the in-wheel motor further comprises electromagnets arranged around the hollow stator body and fixed with respect thereto, wherein the cooling channels are arranged for cooling the electromagnets. This protects the electromagnets form overheating, and also reduces the chance of any permanent magnets that are included in a rotor of the in-wheel motor, from being demagnetized due to heat. The electromagnets comprise coils of a conductive material which are arranged for generating a magnetic field, wherein the coils are preferably wound around respective axially oriented bars of magnetic laminated material, with the bars being spaced apart from each other by slots in which respective coils with windings are partially arranged. In the latter case, a substantial portion of the heat generated by the electromagnets is at the respective distal ends of the bars where the coil windings generally make a 180 degrees turn.

In an embodiment, the in-wheel motor comprises control electronics for powering the electromagnets, wherein said control electronics are arranged within the hollow stator housing. The control electronics, or a module in which the control electronics are accommodated, are dimensioned to fit within the hollow stator body, has a length smaller than a length of the open end in the hollow stator body along the longitudinal axis thereof, and a width less than the diameter of the open end. The in-wheel motor of this embodiment is preferably adapted for allowing the control electronics to be placed into the hollow stator body and taken out again, through the open end of the hollow stator body. In an embodiment the plurality of channels is partitioned into at least three groups of channels, wherein the channels within each group are connected in parallel and define a direction of flow for said coolant such that for each channel within a group the coolant flows substantially in a same direction along the circumference of the hollow stator body from a first end of the channel to a second end of the channel, wherein at least one of said groups comprises two or more channels, and wherein the groups are connected in series. As two or more channels of at least one of the groups are connected in parallel, the flow of coolant through that group is improved. Moreover, as the groups are connected in series, the coolant cannot (partially) bypass any of the groups, thus ensuring that coolant flows through each group and consequently heat can be absorbed from the hollow stator body at or near the location of each group. It is desirable to avoid connecting all circumferential cooling channels in parallel, as this has been found to result in a poor distribution of the flow through the channels. In particular it has been found that when all cooling channel are connected in parallel, the velocity of the liquid through the channels is the highest at the channels closest to the inlet and the outlet but very low in the intermediate channels, which may result in insufficient cooling by the liquid coolant at the positions of the intermediate channels.

In an embodiment the channels are arranged such that within each pair of groups formed by a first of said groups and a second of said groups directly downstream of the first group, the direction in which the coolant flows in channels of the first group along the circumference of the hollow stator body is opposite to the direction in which the coolant flows in channels of the second group along the circumference of the hollow stator body. The groups of channels are thus arranged for letting the coolant meander rather than spiral from one axial end of the plurality of channels to another axial end thereof.

In an embodiment the plurality of cooling channels comprises a first circumferential cooling channel extending from the inlet at a first axial position along the hollow stator body, a second circumferential cooling channel extending at a second axial position along the hollow stator body and in fluid connection with the first cooling channel, and a plurality of intermediate circumferential cooling channels arranged along axial positions in between the first and second circumferential cooling channels and in fluid connection with the second cooling channel, wherein the second cooling channel is arranged downstream of the first cooling channel.

In a preferred embodiment the intermediate circumferential cooling channels are arranged upstream of the outlet and downstream of the second cooling channel. When liquid coolant, at a temperature below that of the hollow stator body, is circulated through the plurality of channels, it is thus ensured that the liquid coolant is coolest when passing through the cooling channels at or near the first and second axial positions. Preferably, these positions substantially correspond preferably to the positions of distal ends of bars of electromagnets of the stator as described above. In this manner, it can be ensured that those parts of the electric motor that are most susceptible to overheating are sufficiently cooled In an alternative embodiment, the intermediate cooling channels are arranged upstream of the outlet and upstream of the second cooling channel. This has the advantage that the axial component of the direction of flow of the liquid coolant does not have to reverse when it is circulated through the plurality of channels.

In an embodiment each of the circumferential cooling channels is formed as an annular sector extending 180 degrees or more and less than 360 degrees around the longitudinal axis of said hollow stator body. Each of the channels thus does not extend around the complete circumference of the hollow stator body, so that each channel allows the flow of liquid coolant along the direction of flow from the first end of said channel to the second end of said channel, while blocking liquid coolant from flowing along the direction of flow from said second end to said first end. Liquid coolant is in this manner substantially prevented from traveling two or more times through the same channel before entering another of the channels. The annular sectors preferably extend 180 degrees or more around the longitudinal axis, more preferably 300 degrees or more.

In an embodiment the hollow stator body comprises a cooling jacket which defines the outer circumference of the hollow stator body, wherein the cooling channels are provided in the cooling jacket. The cooling jacket may have been formed separately from the hollow stator body, and been mounted thereto during assembly of the in-wheel motor. For instance the cooling jacket may have been attached to the hollow stator body by interference fitting. This may be achieved by generating an interference fitting temperature difference between the cooling jacket and the hollow stator body, e.g. of 100° C. or more, or 140° C. or more, which results in deformation of one or both thereof allowing the cooling jacket to be slid over the hollow stator body. In such a case, the outer surface of the hollow stator body onto which the cooling jacket is slid is preferably smooth cylindrical, allowing the cooling jacket to be rotated freely around the hollow stator body until a desired orientation is reached. When the temperature difference between the cooling jacket and the hollow stator body decreases, the two will deform to ensure a tight and fixed fit therebetween. During the interference fitting process, generating a temperature difference between the cooling jacket and the hollow stator body may comprise flowing a heating liquid, such as oil, at a temperature at or above the interference fitting temperature difference through the cooling channels.

In an embodiment the connector member comprises or is made of steel or cast iron, and wherein the cooling jacket comprises a different material than the connector member, preferably aluminum. The connector member, e.g. in the form of a connector stub, provides structural strength to the in-wheel motor, while the cooling jacket can be made from a more thermally conductive or light-weight material and/or a material which is more resistant to formation of Eddy currents under the influence of the electromagnets. Preferably, the connector member comprises steel or cast iron and/or is made from the same material as the hollow stator body.

In an embodiment the thermal conductivity of the cooling jacket material is at least 100 Watt per meter per Kelvin. In order to achieve this the cooling jacket may be made of aluminum or an aluminum alloy.

In an embodiment, the outer surface of the cooling jacket is smooth cylindrical, with the inlet and outlet of the cooling jacket lying completely within the cylindrical volume defined by said outer surface. For instance, the inlet and/or outlet may lie at a transverse side of the cooling jacket, and/or may extend on the inner side of the cooling jacket. Thus, no portion of the inlet or outlet extends beyond the smooth cylindrical outer surface of the cooling jacket, facilitating mounting of electromagnets on the smooth cylindrical outer surface.

In an embodiment the cooling jacket is formed separately from the hollow stator body, and is attached to the hollow stator body by interference fitting. This may be achieved by generating an interference fitting temperature difference between the cooling jacket and the hollow stator body, e.g. of 100° C. or more, or 140° C. or more, which results in deformation of one or both thereof allowing the cooling jacket to be slid over the hollow stator body.

In an embodiment, the electromagnets are attached to the cooling jacket and/or to the hollow stator body by means of interference fitting. This may be achieved by cooling the cooling jacket or hollow stator body, e.g. by circulating a cooling fluid therethrough, and heating the electromagnets until there is a temperature difference e.g. of 100° C. or more, or 140° C. or more, which results in deformation of one or both thereof allowing the electromagnets to be slid over the cooling jacket or hollow stator body. Especially when the outer surface of the cooling jacket is smooth cylindrical, the electromagnets may in this manner be attached to the cooling jacket in a particularly simple manner.

In an embodiment the plurality of cooling channels is at least partially formed in the hollow stator body, e.g. as depressions and/or recesses in the outer circumferential surface of the hollow stator body. If the cooling channels are only partially formed in the hollow stator body, the in-wheel motor may be provided with a cylindrical cover for forming a bounding surface for the cooling channels. Alternatively, the plurality of cooling channels may be completely formed in the hollow stator body.

In an embodiment the cooling channels are cooling channels made by casting of a metal or metal alloy.

In an embodiment the connector member further comprises a coolant discharge channel which extends through the shaft and the end plate and is in fluid connection with the outlet.

As the discharge channel extends through the shaft, a portion of the rotor of the in-wheel motor can placed radially close to the shaft at the vehicle side of the rotor, allowing the rotor to be supported via bearings on the shaft at the vehicle side.

According to a second aspect, the present invention provides a cooling jacket for use in an wheel-motor, preferably an in-wheel motor as described herein, the cooling jacket having a longitudinal axis and comprising: a plurality of cooling channels adapted for circulation of a liquid, wherein the cooling channels extend substantially circumferentially around the longitudinal axis, the plurality of cooling channels having an inlet for supply of liquid coolant to the plurality of channels, and an outlet for discharging liquid coolant from the plurality of channels; wherein the plurality of cooling channels comprises a first circumferential cooling channel extending from the inlet at a first axial position along the longitudinal axis, a second circumferential cooling channel extending at a second axial position along the longitudinal axis, and a plurality of intermediate circumferential cooling channels arranged along axial positions in between the first and second circumferential cooling channels, wherein, in the direction of flow, the second cooling channel is arranged downstream of the first cooling channel.

In an embodiment the plurality of channels is partitioned into at least three groups of channels, wherein the channels within each group are connected in parallel and define a direction of flow for said coolant such that for each channel within a group the coolant flows substantially in a same direction along the circumference of the hollow stator body from a first end of the channel to a second end of the channel, wherein at least one of said groups comprises two or more channels, and wherein the groups are connected in series.

In an embodiment the plurality of channels is partitioned into at least three groups of channels, wherein the channels within each group are connected in parallel and define a direction of flow for said coolant such that for each channel within a group the coolant flows substantially in a same direction along the circumference of the hollow stator body from a first end of the channel to a second end of the channel, wherein at least one of said groups comprises two or more channels, and wherein the groups are connected in series.

In an embodiment the intermediate cooling channels are arranged downstream of the second cooling channel, and preferably upstream of the outlet.

In an embodiment the cooling jacket has a smooth cylindrical inner surface, for abutting a smooth cylindrical outer surface of the outer stator body. This allows the cooling jacket to be easily slid onto the outer stator body.

In an embodiment each of the circumferential cooling channels is formed as an annular sector extending 180 degrees or more and less than 360 degrees around the longitudinal axis of said hollow stator body.

In an embodiment the plurality of cooling channels comprises a first circumferential cooling channel extending from the inlet at a first axial position along the hollow stator body, a second circumferential cooling channel extending at a second axial position along the hollow stator body and in fluid connection with the first cooling channel, and a plurality of intermediate circumferential cooling channels arranged along axial positions in between the first and second circumferential cooling channels and in fluid connection with the second cooling channel, wherein the second cooling channel is arranged downstream of the first cooling channel.

In an embodiment the intermediate circumferential cooling channels are arranged upstream of the outlet and downstream of the second cooling channel.

In an embodiment, the cooling jacket has a substantially smooth cylindrical outer surface, with the inlet and outlet lying completely on an inner side of said outer surface.

According to a third aspect, the invention provides an in-wheel motor for a vehicle, comprising:

a stator with a connector member for attaching the stator to the vehicle, the connector member comprising a shaft, an end plate of a larger diameter than the shaft, the stator further comprising a hollow stator body having a cylindrical outer surface and mounted to the connector member, wherein, at a side opposite from the connector member, the hollow stator body has an open end with a diameter larger than the diameter of the shaft, and wherein the shaft and the end plate are provided with one or more ducts which extend from an exterior of the stator through the shaft and end plate and debauch in the end plate. The one or more ducts may comprise ducts for supply and/or discharge of cooling liquid, and/or for power supply cables which are connected to control electronics that are arranged in the hollow stator body.

According to a fourth aspect, the invention provides an in-wheel motor for a vehicle, the in-wheel motor comprising: a stator with a connector member for attaching the stator to the vehicle, the connector member comprising a shaft, an end plate of a larger diameter than the shaft, and a coolant supply duct extending through said shaft and in fluid connection with a passage for coolant in the end plate, the stator further comprising a hollow stator body having a cylindrical outer surface and connected to the connector member, wherein a plurality of cooling channels adapted for circulation of a liquid coolant extends along the hollow stator body and are in fluid connection with said coolant supply duct, said plurality of cooling channels having an inlet for supply of liquid coolant to the plurality of channels and an outlet for discharging liquid coolant from the plurality of channels; wherein, at a side opposite from the connector member, the hollow stator body has an open end with a diameter larger than the diameter of the shaft.

SHORT DESCRIPTION OF DRAWINGS

The present invention will be discussed in more detail below, with reference to the attached drawings, in which FIGS. 1A and 1B respectively show a cross-sectional view and an cut-away isometric view of a drive assembly for use with the present invention, FIG. 2A schematically shows a perspective view of cooling channels of a stator body according to the present invention.

DESCRIPTION OF EMBODIMENTS

Figure 1A:
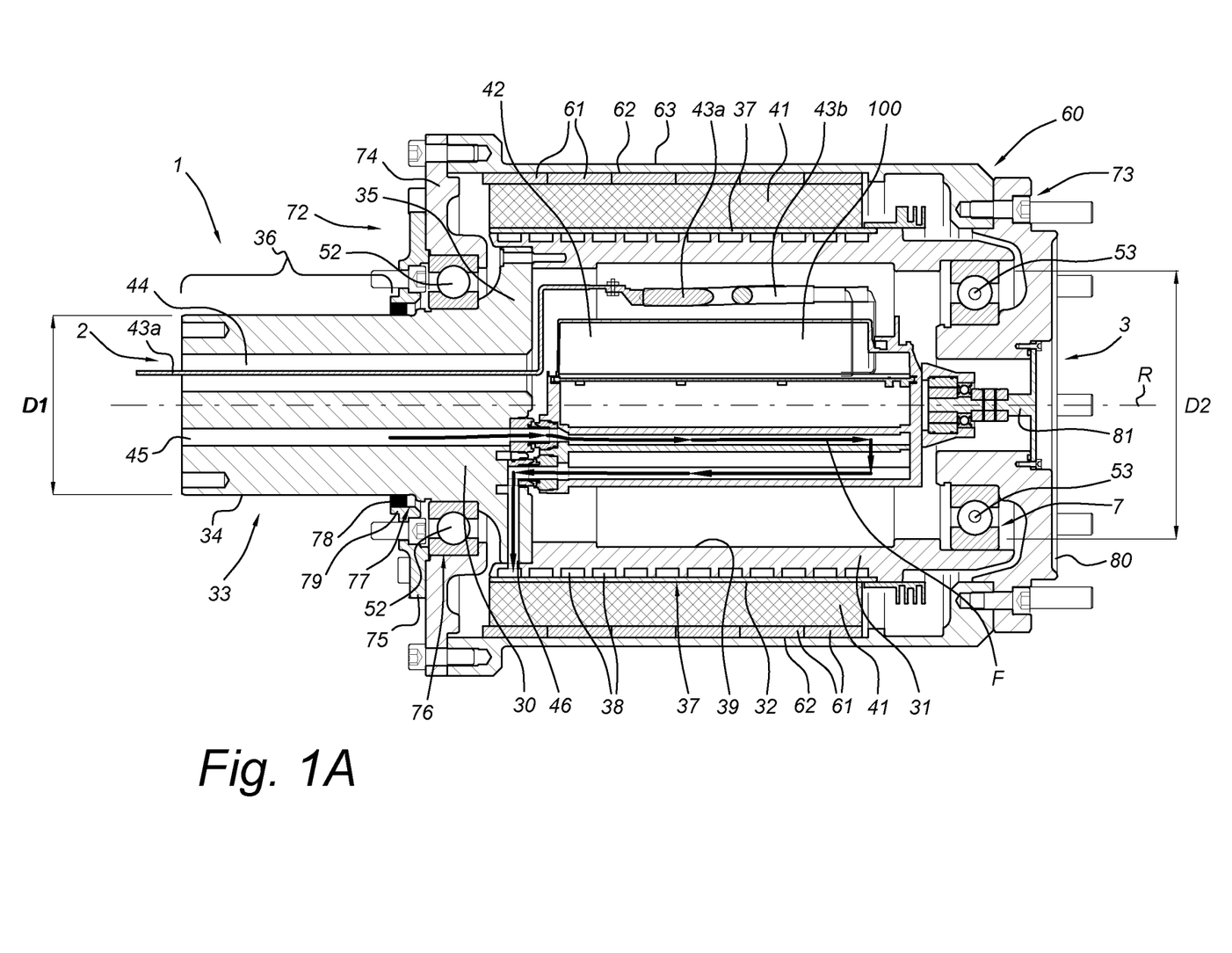

FIG. 1A shows a cross-sectional view of a drive assembly 1 for use with the present invention. The drive assembly comprises a stator 30 with a hollow stator body 31 which has an outer surface 32 around which a rotor 60 is arranged. The drive assembly further comprises an connector member 33, arranged at a vehicle side 2 of the assembly 1 for attaching the drive assembly to the vehicle. The connector member 33 comprises a shaft 34 with a diameter D1 and flange 35 which is fixedly connected to the stator body 31. The open end 7 of the hollow stator body 31 has an inner diameter D2 larger than D1, allowing control electronics 42 to be inserted through the open end 7 when the road side cover plate 80 and the road side bearings 53 are detached from the rotor 60. The flange 35 lies within the rotor 60 and has a larger diameter than a portion 36 of the shaft 34 which lies outside the peripheral surface 63 of the rotor 60. For supporting rotational movement of the rotor 60 around the axis of rotation R, vehicle side bearings 52 are provided via which the rotor supported on the member 33 on the vehicle side. On the road side 3, the rotor is rotatingly supported on the stator body 31 via road side bearings 53.

A plurality of permanent magnets 61 is attached on an inner circumferential surface 62 of the rotor 60 and can rotate around electromagnets 41 of the stator 30. The electromagnets 41 are fixed on the stator body 31 and drive rotation of the rotor by interaction between the permanent magnets 61 and the magnetic flux generated by the electromagnets 41. The stator 30 and rotor 60 form an electric motor adapted for directly driving rotation of a wheel around axis of rotation R. For controlling and powering the electromagnets 41, power control electronics 42 are arranged within the hollow stator body 31. The power control electronics 42 comprise components, such as IGBT's, for converting electrical energy from a power supply system of the vehicle, e.g. a battery pack and/or an electric generator, to an AC form suitable for use by the electric motor. A resolver 81 provides an angular position signal indicative of an angular position of the rotor to the power control electronics so that the alternating current is supplied in phase with the magnetic field of the rotor.

To prevent overheating of the power control electronics when the electric motor is in operation, cooling ducts (not shown) are provided close to the power control electronics 42 within the interior of the stator body 31 and spaced apart from the body 31. Coolant is supplied to the cooling ducts via a coolant supply channel 45 which runs through the connector member 33 from the exterior of the rotor to its interior. Liquid coolant flows from the supply channel 45, along the power control electronics 42, the coolant flows via passage 46 in the connector member 33, to a cooling jacket 37 which is provided on the outer surface 32 of the stator body 31. The flow of coolant F is schematically indicated in FIG. 1A by arrows in the supply channel 45, along the control electronics 42 and through passage 46 to the cooling jacket 37. The cooling jacket 37 is provided with channels 38 which form a circuit that runs along the hollow cylindrical body 31 and provides a passage through which liquid coolant flows to cool the electromagnets 41 which are arranged at an outer side 40 of the cooling jacket 37. Relatively cold coolant can thus be supplied through the coolant supply channel 45 with the coolant warming up during its passage through the cooling ducts and absorbing heat energy from the power control electronics 42, and subsequently passing through channels 38 to absorb heat-energy from the electromagnets 41 before being removed from the drive assembly and led back to the vehicle through a coolant discharge channel (not shown) which extends through the connector member 33. The warmed up coolant is preferably cooled in a heat exchanger on the vehicle, after which it is recirculated through the coolant supply channel 45.

Power supply lines 43*a*, 43*b* for supplying power to the power control electronics 42 run from the exterior of the rotor 60, through passage 44 in the connector member 33, to the power control electronics.

The rotor 60 comprises a substantially cylindrical rotor body 71 which has transverse ends 72, 73 respectively at its vehicle side 2 and at its road side 3. Both transverse ends 72, 73 are substantially closed off in order to prevent foreign particles, such as dust and wear particles from the road or released by a braking system of the vehicle, from entering the interior of the hollow rotor 60. The vehicle side of the rotor is substantially closed off by a side plate 74 which extends transversely to the axis of rotation R and by a cover plate 75. The side plate 74 and cover plate 75 are each provided with an opening through which the portion 34 of the connector member 33 extends. The side plate 74 supports the vehicle side bearings 52 while the cover plate 75 is attached to the side plate 74 to cover the bearings 52 at their transverse vehicle side 2 and comprises an opening 77 through which portion 34 extends. The cover plate 75, together with a shaft seal 78 which is arranged between the inner circumferential edge 79 of the opening 77 and the outer circumference of the shaft 34 of the connector member 33, prevents foreign particles from damaging the vehicle side bearings 52. Additionally, the cover plate 75 and shaft seal substantially prevent such particles from entering the interior 5 of the rotor from the vehicle side 2, where the particles could interfere with the electromagnets 41.

The road side bearings 53, which are arranged at an inner side of the stator body 31, are covered on the road side 3 by a second cover plate 80. A resolver 81 rotationally connects the stator 30 to the second side plate 80 and is adapted for detecting an angular position of the rotor 60 relative to the stator 30.

Figure 1B:
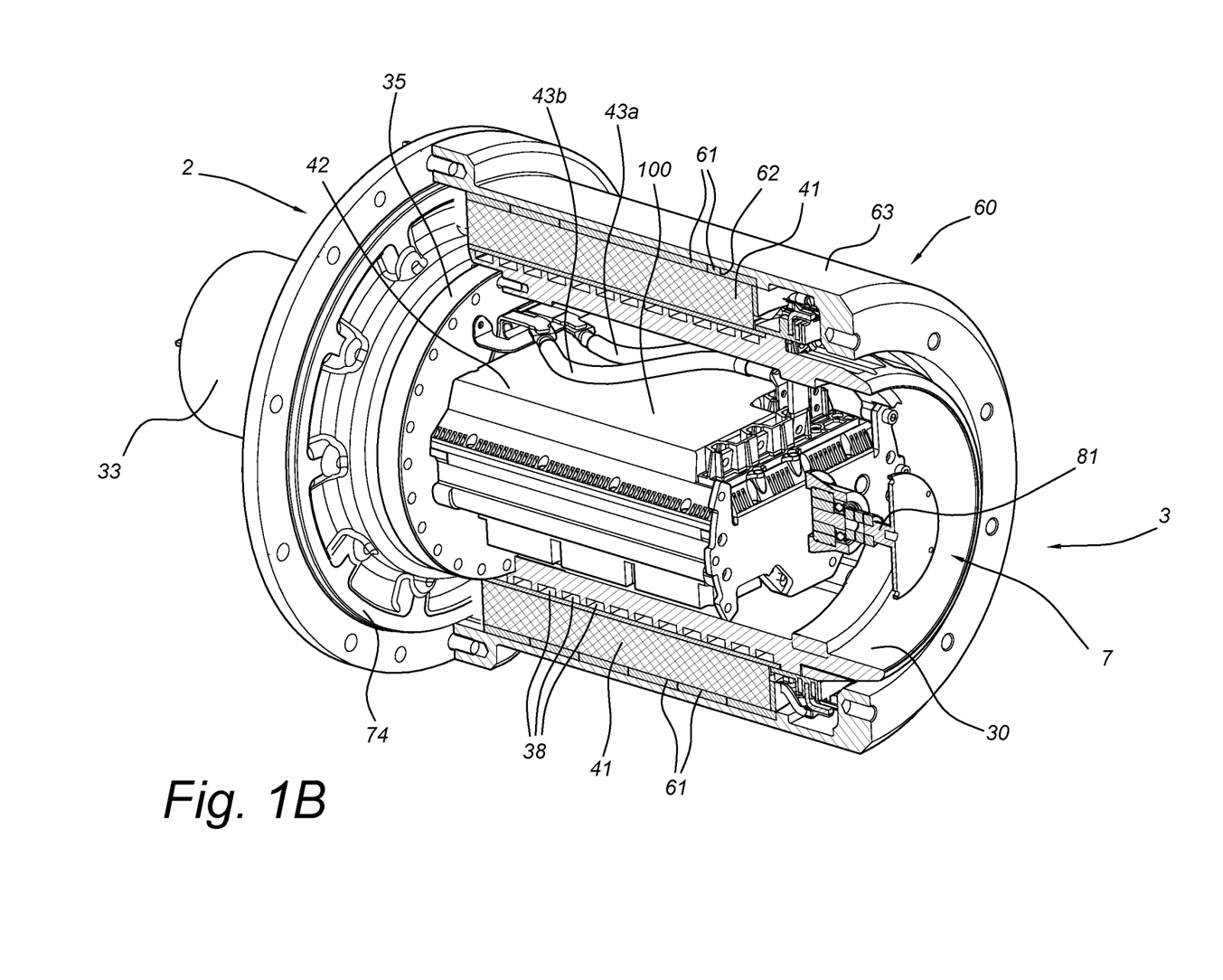

FIG. 1B shows a partially cut-away isometric view of the drive assembly of FIG. 1A, in which the second cover plate 80 and the road side bearings 53 however are not shown to allow a better view of the hollow stator body 31 and the resolver 81.

Figure 2A:
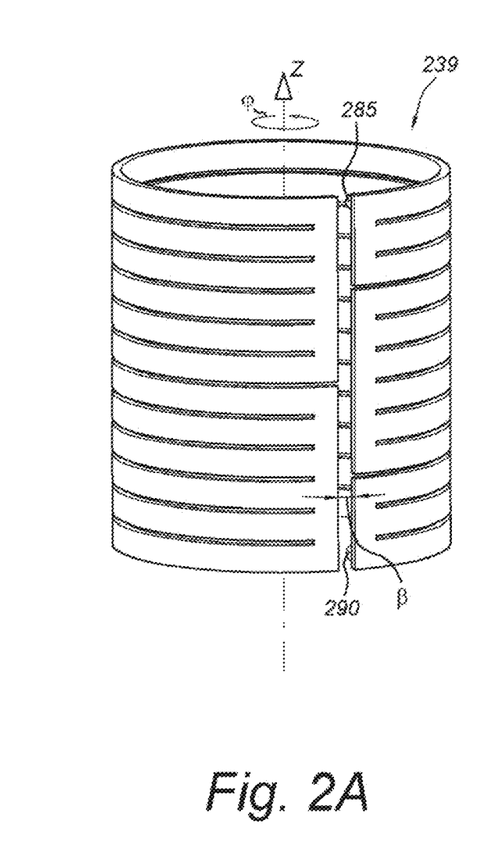
Figure 2B:
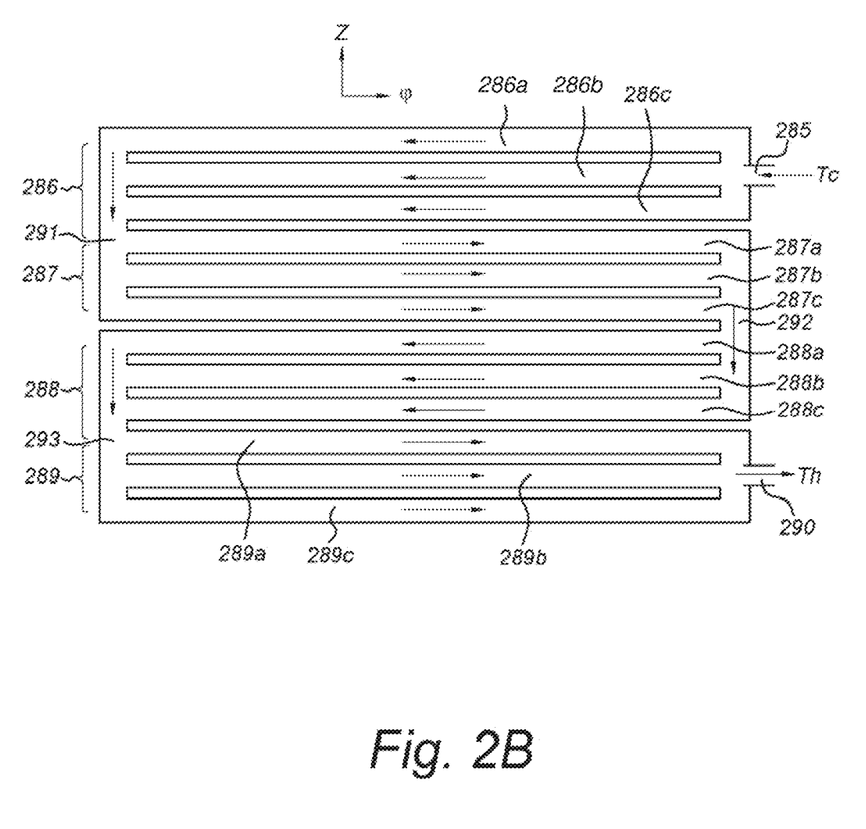
FIG. 2B shows a two-dimensional representation in the axial-azimuthal direction, showing circulation of coolant through the cooling channels of FIG. 2A.

FIGS. 2A and 2B respectively schematically show an isometric view of a channel layout of a first embodiment of a cooling jacket 239 according to the present invention, and a projection thereof onto a polar coordinate system with an axis Z corresponding to the longitudinal axis of the plurality of channels, and an axis φ corresponding to a rotation around the axis Z. This channel layout can be the layout of channels in the jacket 39 shown in FIG. 1A. It will however be appreciated that instead of being incorporated in a cooling jacket, the channel layout shown can also be partially or completely be incorporated in the hollow stator body 31 of FIG. 1A.

The cooling jacket 239 comprises an inlet 285 through which liquid coolant is supplied to the jacket, and a plurality of substantially circumferentially extending channels 286*a*-286*c*-289*a*-289*c* through which the coolant may flow to absorb heat energy from the hollow stator body, before exiting the jacket out outlet 290. The channels do not form a closes annuluses, but rather form annular sections which extend for about 350 degrees around the axis Z, so that each annular section has a first end and an opposite second end spaced apart from each other by an angle β of about 10 degrees.

The channels are divided into four groups of substantially circumferential channels 286-289, the channels in each group being connected in parallel with each other and defining a same direction of flow for the liquid coolant along the circumferential direction. In the embodiment shown, group 286 is a first group of channels having a first channel 286*a* at a first axial position along longitudinal axis Z of the plurality of channels. Group 289 is a second group of channels having a second channel 289*c* at a second axial position along the axis Z, and the remaining groups 287,288 are intermediate groups that extend arranged at intermediate axial positions between the first and second axial positions. As shown, all channels other than the first channel 286*a* and the second channel 289*c* are arranged along the axis Z between the first and second channels.

Each group of channels has a common point 285, 291-293 at which the liquid coolant is supplied to the group, and a common exit point 291-293, 290 at which the coolant exits the group. For instance, inlet 285 forms a common supply point for channels 286*a*-285*c* of the first group 286. Exit point 291 forms a common exit point at which the coolant exits the first group of channels and enters second group of channels 287. Exit point 291 thus also forms the common supply point for the second group of channels 289 which is arranged.

Liquid coolant enters the cooling jacket at inlet 285 at a first, relatively cool temperature Tc, passes in sequential order through all of the groups 286-289 while accumulating heat energy, and exits the cooling jacket at outlet 290 at a relatively high temperature Th which is higher than Tc. The flow of liquid between any two groups that are adjacent in flow direction is in a same axial direction parallel to the axis Z.

The liquid coolant can flow easily through each of the groups as each group has several channels which are connected in parallel. Nonetheless, it is ensured that there is sufficient flow of liquid through each of the groups, since as the groups are connected in series, the coolant cannot bypass any of the groups.

Figure 3A:
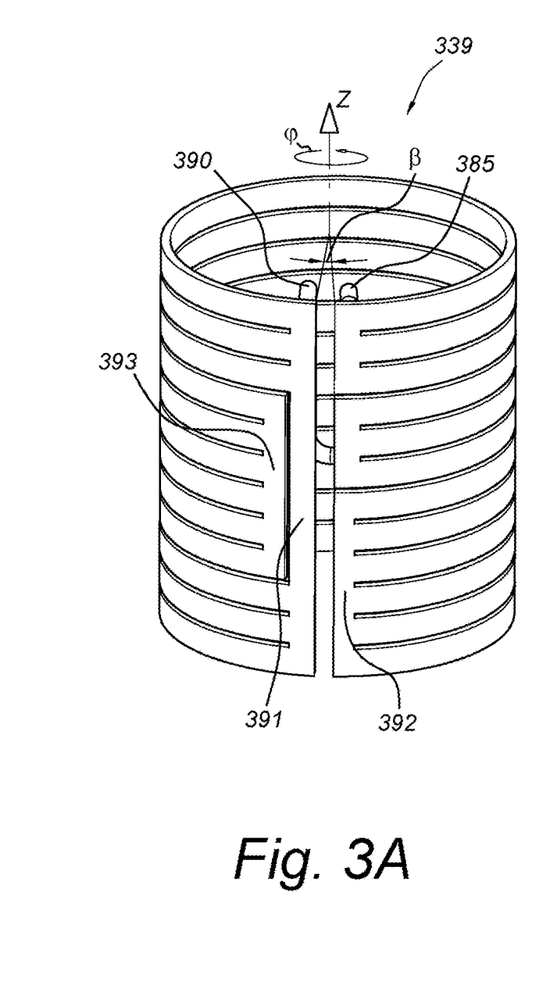
FIG. 3A shows a perspective view of cooling channels of a stator body according to an another embodiment of the present invention.
Figure 3B:
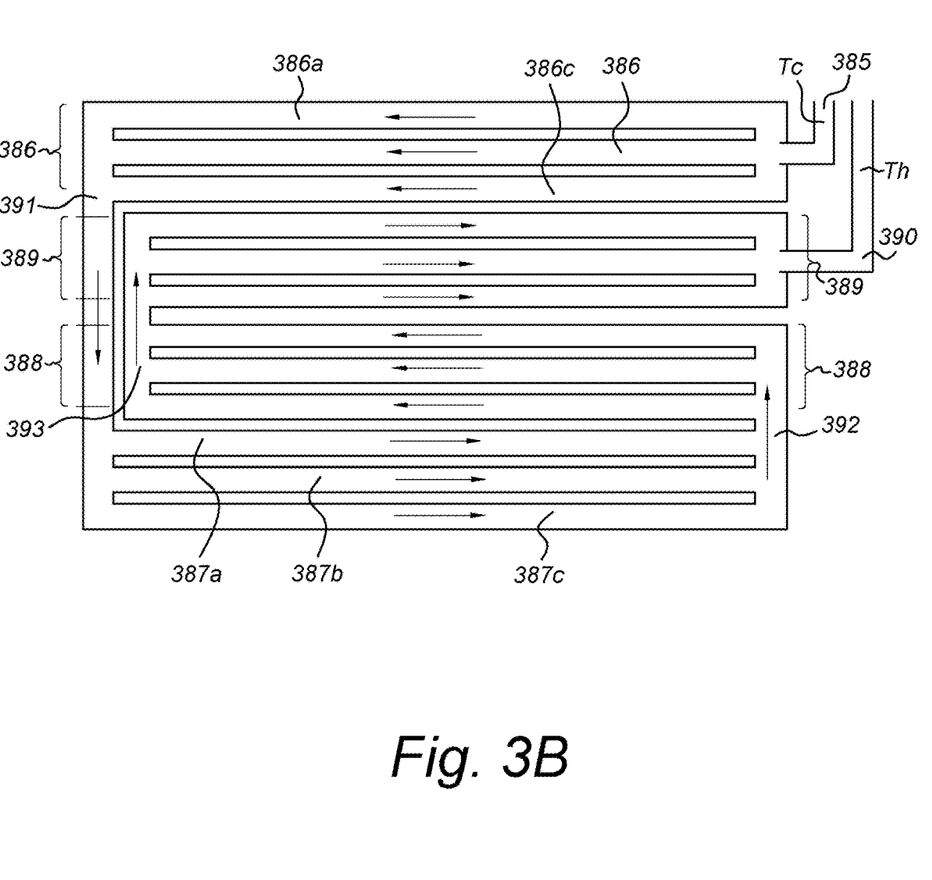
FIG. 3B shows a two-dimensional representation in the axial-azimuthal direction, showing circulation of coolant though the cooling channels of FIG. 3A.

FIGS. 3A schematically shows an isometric view of a channel layout of a second, embodiment of a cooling jacket according to the present invention, which is a preferred embodiment. FIG. 3B shows a projection thereof onto a polar coordinate system. It will be appreciated that though this channel layout is shown to be part of a cooling jacket, it may also be partially or completely be incorporated in the hollow stator body 31 of FIG. 1A.

The cooling jacket 339 comprises an inlet 385 through which liquid coolant at a relatively low temperature Tc is supplied to the jacket. The jacket further comprises a plurality of substantially circumferentially extending channels 386a-386c-389a-389c through which the coolant may flow to absorb heat energy from the hollow stator body, before exiting the jacket out outlet 390. The channels are again divided into four groups of channels 386-389, the channels in each group being connected in parallel with each other and defining a same direction of flow for the liquid coolant along the circumferential direction. Each group of channels has a common point 385, 391-393 at which the liquid coolant is supplied to the group, and a common exit point 391-393, 390 at which the coolant exits the group.

Liquid coolant enters the cooling jacket at inlet 385 at a first, relatively cool temperature Tc, passes through all the groups 386-389 while accumulating heat energy. The liquid coolant first flows through channels 386a-386c of the first group 386, which include first channel 386a that is arranged at a first axial position of the jacket. This first axial position preferably corresponds substantially to the position of the distal ends of the electromagnets 41 on the vehicle side of the in-wheel motor shown in FIG. 1A. After having passed through the channels of the first group, the next downstream group is the second group 287 which comprises a second channel 387 that is arranged at a second axial position of the jacket and preferably corresponds substantially to the position of the distal ends of the electromagnets on the road side of the in-wheel motor. Thus the liquid passes through channels of the groups at the axial distal ends of the jacket, before passing though the channels of the intermediate groups 388, 389. After having passed the intermediate groups 388,389 which are downstream of the second group 387, the liquid exits the cooling jacket at outlet 390 at a relatively high temperature Th which is higher than Tc. This arrangement of cooling channels allows relatively cool cooling liquid to be delivered to those axial ends of the plurality of channels where most cooling is desired. Once these ends have been cooled, and for instance also the axial ends of the bars of the electric motor have been cooled, the somewhat warmer liquid passes through the intermediate groups 388,399, e.g. for cooling intermediate sections of the electric motor.

The invention claimed is:

1. An in-wheel motor for a vehicle, the in-wheel motor comprising:
a stator comprising
a connector member configured to attach the stator to the vehicle, the connector member comprising
a shaft,
an end plate of a larger diameter than the shaft, and
a coolant supply duct extending through said shaft and in fluid connection with a passage for coolant in the end plate, and
a hollow stator body having a cylindrical outer surface and connected to the connector member, a plurality of cooling channels configured to circulate a liquid coolant extending along the hollow stator body and being in fluid connection with said coolant supply duct, said plurality of cooling channels having an inlet configured to supply liquid coolant to the plurality of cooling channels and an outlet configured to discharge the liquid coolant from the plurality of cooling channels; and
a plurality of electromagnets disposed around the hollow stator body and fixed with respect thereto, the electromagnets being configured to be cooled by the cooling channels,
wherein, at a side opposite from the connector member, the hollow stator body has an open end with a diameter larger than the diameter of the shaft,
wherein the plurality of cooling channels is disposed on the cylindrical outer surface of the hollow stator body and is partitioned into at least three groups of circumferential cooling channels, the circumferential cooling channels within each of the at least three groups of circumferential cooling channels being connected in parallel and defining a direction of flow for said coolant such that, for each of the circumferential cooling channels within a respective one of the groups, the coolant flows substantially in a same direction along the circumference of the hollow stator body from a first end of the respective circumferential cooling channel to a second end of the respective cooling channel, at least one of said groups comprising two or more circumferential cooling channels, the groups being connected in series,
wherein each of the circumferential cooling channels is formed as an annular sector extending 180 degrees or more and less than 360 degrees around the longitudinal axis of said hollow stator body,
the first group of circumferential cooling channels extends from the inlet at a first axial position along the hollow stator body,
the second group of circumferential cooling channels extends at a second axial position along the hollow stator body and in fluid connection with the first group of circumferential cooling channels,
the third group of intermediate circumferential cooling channels is disposed along axial positions in between the first and second groups of circumferential cooling channels and in fluid connection with the second group of circumferential cooling channels, and
the second group of circumferential cooling channels is disposed downstream of the first group of circumferential cooling channels, and the third group of intermediate circumferential cooling channels is disposed upstream of the outlet and downstream of the second group of circumferential cooling channels.

2. The in-wheel motor according to claim 1, wherein the circumferential cooling channels are disposed such that, within each pair of groups formed by the first group of circumferential cooling channels and the second group of circumferential cooling channels directly downstream of the first group of circumferential cooling channels, the direction in which the coolant flows in channels of the first group of cooling channels along the circumference of the hollow stator body is opposite to the direction in which the coolant flows in channels of the second group of circumferential cooling channels along the circumference of the hollow stator body.

3. The in-wheel motor according to claim 1, wherein the open end of the hollow stator body is at a road side of the in-wheel motor, and
the in-wheel motor further comprises control electronics configured to power the electromagnets, said control electronics being disposed within the hollow stator housing.

4. The in-wheel motor according to claim 3, wherein the control electronics are configured to be placed into and removed from the hollow stator body, through the open end of the hollow stator body.

5. The in-wheel motor according to claim 1, wherein each of the circumferential cooling channels is formed as an annular sector extending 180 degrees or more and less than 360 degrees around the longitudinal axis of said hollow stator body.

6. The in-wheel motor according to claim 1, wherein the hollow stator body comprises a cooling jacket that defines the outer circumference of the hollow stator body, the circumferential cooling channels being provided in the cooling jacket.

7. The in-wheel motor according to claim 6, wherein the connector member comprises or is made of steel or cast iron, and
wherein the cooling jacket comprises a different material than the connector member.

8. The in-wheel motor according to claim 6, wherein the thermal conductivity of the cooling jacket material is at least 100 Watt per meter per Kelvin.

9. The in-wheel motor according to claim 6, wherein the outer surface of the cooling jacket is smooth cylindrical, an inlet and an outlet of the cooling jacket lying completely within the cylindrical volume defined by said outer surface.

10. The in-wheel motor according to claim 6, wherein the cooling jacket is formed separately from the hollow stator body, the cooling jacket being attached to the hollow stator body by interference fitting.

11. The in-wheel motor according to claim 1, wherein the electromagnets are attached to one or more of the cooling jacket and the hollow stator body by interference fitting.

12. The in-wheel motor according to claim 1, wherein the plurality of cooling channels is at least partially formed in the hollow stator body.

13. The in-wheel motor according to claim 1, wherein the plurality of cooling channels are cooling channels made by casting of a metal or metal alloy.

14. The in-wheel motor according to claim 1, wherein the connector member comprises a coolant discharge channel that extends through the shaft and the end plate and is in fluid connection with the outlet.

15. A cooling jacket for use in an in-wheel motor, the cooling jacket having a longitudinal axis, the cooling jacket comprising:
a plurality of cooling channels configured to circulate liquid, the cooling channels extending substantially circumferentially around the longitudinal axis, the plurality of cooling channels having an inlet configured to supply liquid coolant to the plurality of cooling channels, and an outlet configured to discharge the liquid coolant from the plurality of cooling channels, the plurality of cooling channels comprising a first group of circumferential cooling channels extending from the inlet at a first axial position along the longitudinal axis, a second group of circumferential cooling channels extending at a second axial position along the longitudinal axis and in fluid connection with the first group of cooling channels, and a third group of intermediate circumferential cooling channels disposed along the axial positions in between the first and second groups of circumferential cooling channels and in fluid connection with the second group of cooling channels,
wherein, in the direction of flow, the second group of circumferential cooling channels is disposed downstream of the first group of circumferential cooling channels, and
wherein the third group of intermediate circumferential cooling channels is disposed upstream of the outlet and downstream of the second group of circumferential cooling channels.

16. The cooling jacket according to claim 15, wherein the plurality of channels is partitioned into at least three groups of channels, the channels within each of the at least three groups being connected in parallel and defining a direction of flow for said coolant such that, for each of the channels within a respective one of the groups, the coolant flows substantially in a same direction along the circumference of the hollow stator body from a first end of the channel to a second end of the channel, at least one of said groups comprising two or more channels, the groups being connected in series.

17. The cooling jacket according to claim 15, wherein each of the circumferential cooling channels is formed as an annular sector extending 180 degrees or more and less than 360 degrees around the longitudinal axis of said hollow stator body.

18. The cooling jacket according to claim 15, wherein the cooling jacket has a substantially smooth cylindrical outer surface, the inlet and the outlet lying completely on an inner side of said outer surface.

* * * * *